United States Patent [19]
Gordon et al.

[11] Patent Number: 5,862,876
[45] Date of Patent: Jan. 26, 1999

[54] GUIDE LOOP HEIGHT ADJUSTMENT FOR VEHICLE PASSENGER SEAT BELTS

[75] Inventors: Ian Alexander Gordon; Howard James Foster, both of Carlisle, United Kingdom

[73] Assignee: AlliedSignal Ltd., Carlisle Cumbria, United Kingdom

[21] Appl. No.: 793,988

[22] PCT Filed: Sep. 15, 1995

[86] PCT No.: PCT/GB95/02185

§ 371 Date: Mar. 12, 1997

§ 102(e) Date: Mar. 12, 1997

[87] PCT Pub. No.: WO96/08394

PCT Pub. Date: Mar. 21, 1996

[30] Foreign Application Priority Data

Sep. 16, 1994 [GB] United Kingdom ............. 94 18 735

[51] Int. Cl.⁶ .................................................. B60R 21/10
[52] U.S. Cl. ........................................ 180/268; 280/801.2
[58] Field of Search .................. 180/268; 280/801.2, 280/808

[56] References Cited

U.S. PATENT DOCUMENTS

| 4,616,850 | 10/1986 | Sedlmayr | 280/801.2 |
| 4,645,233 | 2/1987 | Bruse et al. | 280/801.2 |
| 4,807,715 | 2/1989 | Nagashima et al. | 180/268 |

FOREIGN PATENT DOCUMENTS

| 2484343 | 12/1981 | France . |
| 3427466 A1 | 3/1985 | Germany . |
| 3736056 A1 | 4/1989 | Germany . |
| 2150012 | 6/1985 | United Kingdom . |

*Primary Examiner*—Kenneth R. Rice
*Attorney, Agent, or Firm*—Markell Seitzman

[57] ABSTRACT

A guide loop height adjustment arrangement for a driver's seat belt has a drive that raises and lowers a guide loop in response to a sensed change in the position of the driver's mirror. The change in the mirror position is indicative of the presence of a seat occupant with a different shoulder height from the preceding seat occupant and therefore causes the guide loop height to be adjusted.

10 Claims, 1 Drawing Sheet

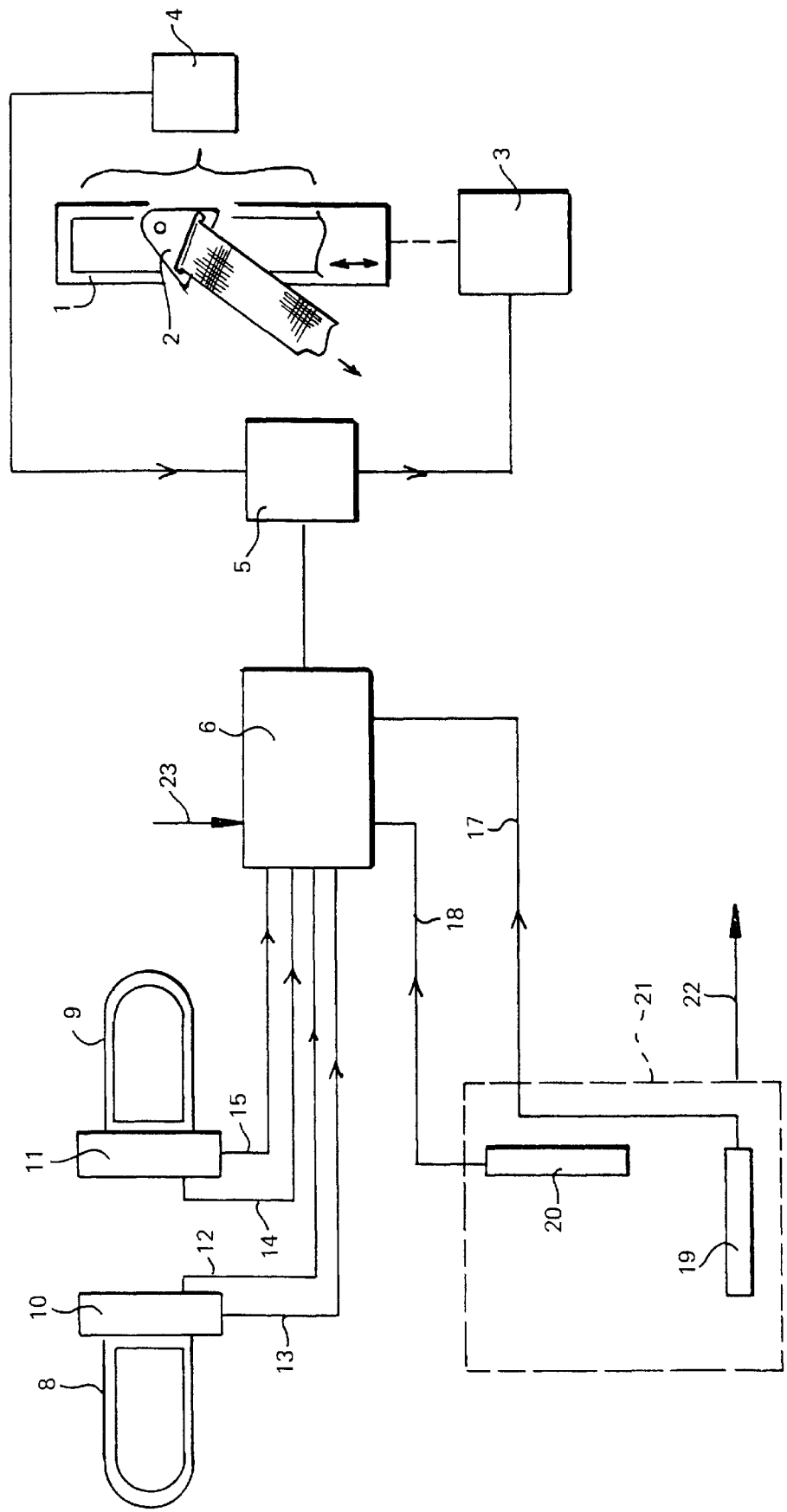

GUIDE LOOP HEIGHT ADJUSTMENT FOR VEHICLE PASSENGER SEAT BELTS

This invention relates to guide loop height adjustment for vehicle passenger seat belts.

Vehicle passenger seat belt systems as employed in private motor cars are typically three point systems with lap and diagonal belt webbings. Usually the webbing is drawn from the reel of an emergency locking retractor via a passenger shoulder height guide loop before passing diagonally downward across the front of the occupant. The webbing then passes via a buckle tongue and returns across the lap of the occupant to a floor anchorage located generally beneath the guide loop.

In the interests of passenger comfort and safety it is now quite common for vehicle manufacturers to install guide loops which are manually adjustable for height by the occupant so that the point at which the webbing changes direction is approximately the height of the adjacent shoulder of the respective occupant. In cases where there is no such adjustment the guide loop is positioned by the manufacturer to ideally suit a person of notional average shoulder height. Occupants of non-average shoulder height may be subject to reduced safety and/or comfort.

In a case where manual height adjustment is provided by the vehicle manufacturer, there is obviously a possibility that an occupant may be non-vigilant either through complete unawareness of the presence of the adjustment facility or simply inadvertently forgetting to suitably reset the adjustment.

The object of the present invention is to provide means for making an automatic adjustment of the height of a seat belt guide loop in spite of non-vigilance by an occupant.

According to the present invention there is provided a guide loop height adjustment arrangement for a vehicle drivers' seat belt comprising a drive means operable to raise and lower a guide loop having means operable to sense a change of position of a drivers' mirror and means responsive to such change indicative of the presence of a seat occupant of different shoulder height from a preceding seat occupant to activate said drive means to reposition said guide loop.

In one embodiment of the invention computation means is provided which utilises the positions of adjustable nearside and offside rear view driving mirrors and the position of an adjustable drivers' seat to calculate a drivers' shoulder height and activates said drive means to position said guide loop.

In an alternative embodiment of the invention means may be provided for sensing a departure of the tilt angle of an interior rear view mirror from a nominal average setting and correspondingly making a departure of the height setting of a guide loop based thereupon.

In order that the invention may be more clearly understood and readily carried into effect the same will be further described by way of an example with reference to the accompanying drawing which is a schematic illustration of a guide loop height adjustment system.

Referring to the drawing, the height adjuster for the pillar mounted webbing guide loop 2 of a vehicle drivers' seat belt is denoted by reference 1. Typically, this is located within the 'B' post adjacent the drivers' seat and the height of the guide loop 2 is adjustable thereby to suit a range of shoulder heights for the seat occupant. The height of the guide loop 2 is variable by a reversible d.c drive motor 3 mechanically linked thereto by a toothed belt or shaft drive gear mechanism and the position is sensed by a position transducer 4 which may comprise an electrical potentiometer providing a position feedback signal to a signal comparator 5. A control input to 5 is derived from an electronic computation and control unit 6.

For the purposes of controlling the motor 3, the unit 6 makes use of output signals derived from the fore and aft seat position, the seat height where this is adjustable and also the angles of tilt and swing of left and right hand driving mirrors.

The left hand and right hand mirrors are shown diagrammatically at 8 and 9 both of which are adjustable by the vehicle driver manually or by electric motor from the driving position. These mirrors are also provided with respective transducer units 10 and 11. Transducer unit 10 provides a left-tilt output signal ($\theta 2$) on output 12 and a swing output ($\theta 1$) on output 13. Transducer unit 11 provides a right hand tilt output signal on ($\gamma 2$) output 14 and a swing output signal ($\theta 1$) on output 15. All four transducer outputs are fed to the computation and control unit 6 along with transducer outputs on lines 17 and 18 from a fore and aft transducer 19 and a height transducer 20 respectively of a seat position unit 21.

The seat position unit 21 also provides a seat occupancy signal on an output 22 to govern the provision of a seat occupancy signal at an input 23 to the computation unit 6. Such seat occupancy signal may be unnecessary where the seat belt is provided with a buckle having means for sensing the presence of a locked in buckle tongue. Typically such means are provided in some existing systems to initiate a visible or audible seat belt warning to an occupant and may therefore also be used to provide an input such as 23.

In operation, when the computation unit 6 receives a seat occupancy signal on its input 23, this signal acts as an enabling input in response to which the computation unit 6 begins to continuously monitor the inputs on lines 12, 13, 14, 15, 17 and 18. These signals will be changed dependent upon any new mirror settings made by the driver and based on internally stored data. The unit 6 performs the necessary calculation to determine a preferred position for the guide loop. The comparator 5 compares the output of unit 6 with the position feedback signal derived from transducer 4 and actuates the motor 3 to drive the height adjuster 1 to a position at which the position represented by the output of transducer 4 equals the position represented by the output of unit 6.

The above outlined system operates upon the basis that the preferred direction of webbing, from the guide loop to the shoulder of an occupant, is approximately horizontal and this is normally achievable with an average driver with the height adjuster 1 set at a mid-position. A driver of somewhat greater height will require the seat lower and further aft and broadly speaking these parameters can therefore be used to set the height adjuster at a somewhat higher location. However shoulder height in a seated position is clearly not strictly correlatable with leg length and/or head height of an occupant. Nevertheless, by providing transducers which indicate mirror swing and tilt angles, of correctly adjusted mirrors, further information is made available to the computation circuit 6 which is related to eye position and this enables the computation circuit to provide a more precise and statistically more correct signal representation of desired guide loop height.

In some vehicles it may be sufficient to dispense with certain of the transducer signals. For example, some vehicles may not have seat height adjustment.

Again, if the driver adjusts only the seat and one mirror, typically the drivers' side mirror, the computation circuit 6 may be adapted to sense this and reject the inputs from any non-reset mirror.

Since there is in general a predictable correlation between the transducer outputs from the respective individual mirrors and the drivers' seat, in order to deal with the event of a total incompatibility, the computation circuit may be adapted as a precaution to set the guide loop height for an average driver.

In an alternative and possibly simplified embodiment of the invention the drivers' internal rear view mirror may be fitted with a transducer which provides an output signal indicative of an elevation (tilt) angle thereof which is comfortable for driver vision in the normal driving position with the seat correctly adjusted. The computation circuit may then be designed to simply correlate a departure of the guide loop height setting from an average position with any departure of mirror tilt angle from an average position. Whilst such a system introduces the need for a transducer and any necessary electrical connections associated with the interior rear view mirror, it avoids the need for such transducers and at least a near-side mirror drive motor associated with the exterior driving mirrors which are always regarded as more vulnerable to accidental damage. Moreover, this alternative does not call for an albeit unpredictable correlation between seat position signals and a desirable guide loop height setting. An additional advantage resides in the fact that most drivers may instinctively make small adjustments to the interior rear view mirror as of greater priority than adjustments to the exterior side mirrors. The probability that the guide loop height is more correctly set is therefore possibly higher and the system to achieve it may be somewhat simplified.

We claim:

1. A guide loop height adjustment arrangement for a vehicle drivers' seat belt comprising a drive means operable to raise and lower a guide loop having means operable to sense a change of position of a drivers' mirror and means responsive to such change indicative of the presence of a seat occupant of different shoulder height from a preceding seat occupant to activate said drive means to reposition said guide loop.

2. A guide loop height adjustment arrangement according to claim 1, comprising means for sensing the positions of adjustable nearside and offside rear view driving mirrors, means for sensing the position of an adjustable drivers seat and computation means responsive to the outputs of said sensing means to calculate a drivers shoulder height and to activate said drive means to position said guide loop in accordance with the calculated shoulder height.

3. A guide loop height adjustment arrangement according to claim 2, wherein the means for sensing the position of the adjustable' drivers seat senses the fore and aft seat position and the seat height where this is adjustable.

4. A guide loop height adjustment arrangement according to claim 2, wherein the mirror position sensing means detects the angles of tilt and swing of the nearside and offside rear view driving means.

5. A guide loop height adjustment arrangement according to claim 2, wherein the output of any one of the said sensing means is disregarded by the computation means if it does not alter with changes in the outputs of the other sensing means.

6. A guide loop height adjustment arrangement according to claim 1 comprising means for sensing a departure of the tilt angle of an interior rear view mirror from a nominal average setting and computation means responsive to changes in output of said sensing means to calculate a drivers shoulder height and to activate said drive means to position said guide loop in accordance with the calculated shoulder height.

7. A guide loop height adjustment arrangement according to claim 1, comprising means for sensing the actual position of the guide loop, and comparator means for comparing the sensed position of the guide loop with the output of the computation means to provide a difference signal which activates the drive means to reposition said loop.

8. A guide loop height adjustment arrangement according to claim 3, wherein the mirror position sensing means detects the angles of tilt and swing of the nearside and offside rear view driving means.

9. A guide loop height adjustment arrangement according to claim 3, wherein the output of any one of the said sensing means is disregarded by the computation means if it does not alter with changes in the outputs of the other sensing means.

10. A guide loop height adjustment arrangement according to claim 4, wherein the output of any one of the said sensing means is disregarded by the computation means if it does not alter with changes in the outputs of the other sensing means.

* * * * *